US008027844B2

(12) United States Patent
Obrea

(10) Patent No.: US 8,027,844 B2

(45) Date of Patent: Sep. 27, 2011

(54) SYSTEM AND METHOD FOR PROCESSING MAIL

(75) Inventor: Andrei Obrea, Seymour, CT (US)

(73) Assignee: Pitney Bowes Inc., Stamford, CT (US)

( * ) Notice: Subject to any disclaimer, the term of this patent is extended or adjusted under 35 U.S.C. 154(b) by 2686 days.

(21) Appl. No.: 10/249,847

(22) Filed: May 12, 2003

(65) Prior Publication Data

US 2004/0230542 A1 Nov. 18, 2004

(51) Int. Cl.
*G06Q 10/00* (2006.01)
*G06G 7/00* (2006.01)

(52) U.S. Cl. ........................................ 705/1.1; 705/401

(58) Field of Classification Search ............... 705/1, 1.1, 705/400–418
See application file for complete search history.

(56) References Cited

U.S. PATENT DOCUMENTS

| | | | | |
|---|---|---|---|---|
| 4,965,829 | A | 10/1990 | Lemelson | |
| 5,612,889 | A | 3/1997 | Pintsov et al. | |
| 5,724,458 | A | 3/1998 | Katoh et al. | |
| 5,936,865 | A | 8/1999 | Pintsov et al. | 364/478.14 |
| 6,385,504 | B1 * | 5/2002 | Pintsov et al. | 700/226 |
| 6,915,281 | B2 | 7/2005 | Coffy et al. | |
| 2002/0073040 | A1 * | 6/2002 | Schwartz et al. | 705/62 |
| 2002/0149573 | A1 | 10/2002 | Picoult et al. | 345/179 |
| 2003/0046184 | A1 | 3/2003 | Bjorklund et al. | 705/26 |
| 2003/0074562 | A1 * | 4/2003 | Hansen et al. | 713/176 |
| 2003/0101148 | A1 * | 5/2003 | Montgomery et al. | 705/404 |
| 2004/0128264 | A1 | 7/2004 | Leung et al. | |

FOREIGN PATENT DOCUMENTS

| | | | |
|---|---|---|---|
| DE | 44 17 772 | C1 | 11/1995 |
| WO | 02/39378 | A1 | 5/2002 |
| WO | 2004/003854 | A2 | 1/2004 |

OTHER PUBLICATIONS

Dearbail Jordan, Computer Text-Messaging Gets the Pen-and-Ink Treatment, Apr. 23, 2002, The Times: London (UK), 4th Edition, p. 31.*

Carolyn Ong. “Bluetooth Pen Delivers Speed, Effectiveness to Courier FedEx; Handwriting Recognition Joins Armoury of Wireless Technologies Aimed at Cutting Package Delivery Times.” South China Morning Post. Hong Kong. Jan. 28, 2003. p. 3.*

Author Unknown. “Microsoft and Anoto Announce Strategic Alliance: To Offer Pen-based Communications Using the Microsoft. NET Platform; Alliance Opens the Door for Developers to Create a New Class of Pen-based Web Services.” M2 Presswire. Feb. 7, 2002.*

* cited by examiner

*Primary Examiner* — John Hayes
*Assistant Examiner* — Tonya Joseph
(74) *Attorney, Agent, or Firm* — George M. Macdonald; Charles R. Malandra, Jr.; Steven J. Shapiro

(57) ABSTRACT

A method and system for processing postage payments is described. In one configuration a digital pen is utilized to provide an indication of authorization for payment of postage, while the rest of the mail handling is done using existing technology independent of the digital pen infrastructure.

13 Claims, 5 Drawing Sheets

SYSTEM AND METHOD FOR PROCESSING MAIL

BACKGROUND OF INVENTION

The illustrative embodiments described in the present application are useful in systems including those for providing funds accounting devices and more particularly are useful in systems including those for providing for accounting of postage and evidence of postage.

Funds accounting, storing and dispensing systems are potential targets for fraud because they store funds. Certain funds systems are regulated and are typically required to exhibit some level of security capability to prevent or dissuade fraudulent activity. Such systems may also provide some forensic evidence to assist in tracking any fraud that is perpetuated.

For example, postage meters approved by the United States Postal Service (USPS) must exhibit certain security capabilities in order to be approved for use. Many postage meters in the United States provide funds accounting such that a source of funds is debited when postage is prepaid before being placed into the mail stream. Additionally, many postage meters provide proof of the postage payment in the form of printed indicia placed on the mail piece, typically on the upper right hand corner of an envelope. In a postage system that utilizes prepaid funds such as the USPS, a postage meter may account for funds by providing an ascending register to track money spent, a descending register to keep track of available funds and a piece count register to track total number of mail pieces franked. Certain other postal systems utilize post-paid postage wherein a postage meter may incorporate credit accounting features.

Mailing machines including postage meters are commercially available from Pitney Bowes Inc. of Stamford, Conn.

Delivery services typically utilize an infrastructure for collecting, aggregating, transporting, sorting and delivering items. For example, the United States Postal Service (USPS) delivers more than 200 billion pieces of mail a year. The USPS serves about seven million customers daily at approximately 38,000 postal retail outlets and collects mail from more than 326,000 street mail collection boxes. It leases over 26,000 facilities and operates a transport and delivery fleet of about 215,530 vehicles. The USPS utilizes approximately 75,000 pieces of mail processing equipment and over 300 processing plants to sort and ship the mail.

SUMMARY OF INVENTION

The present application describes systems and methods for providing a value transfer system. In an illustrative embodiment, a postage payment system is described including postage payment authorization, accounting, evidencing and verification. In an illustrative embodiment, a mail piece includes at least two identifiers in which a first identifier is associated with the second identifier. The first identifier is utilized in one stage such as for postage payment authorization and accounting and the second identifier is utilized in a second stage such as for postal processing including routing, sorting and postage payment verification when used in a carrier system. Here, the second stage equipment need only be able to decode the second identifier, as there is an association between the first and second identifier. In an alternative, the second identifier is utilized for tracking and tracing the mail piece through the delivery system. In an illustrative embodiment, the second identifier includes a bar code that can be decoded by conventional postal system sorting machine bar code readers.

DETAILED DESCRIPTION

Figure 1:
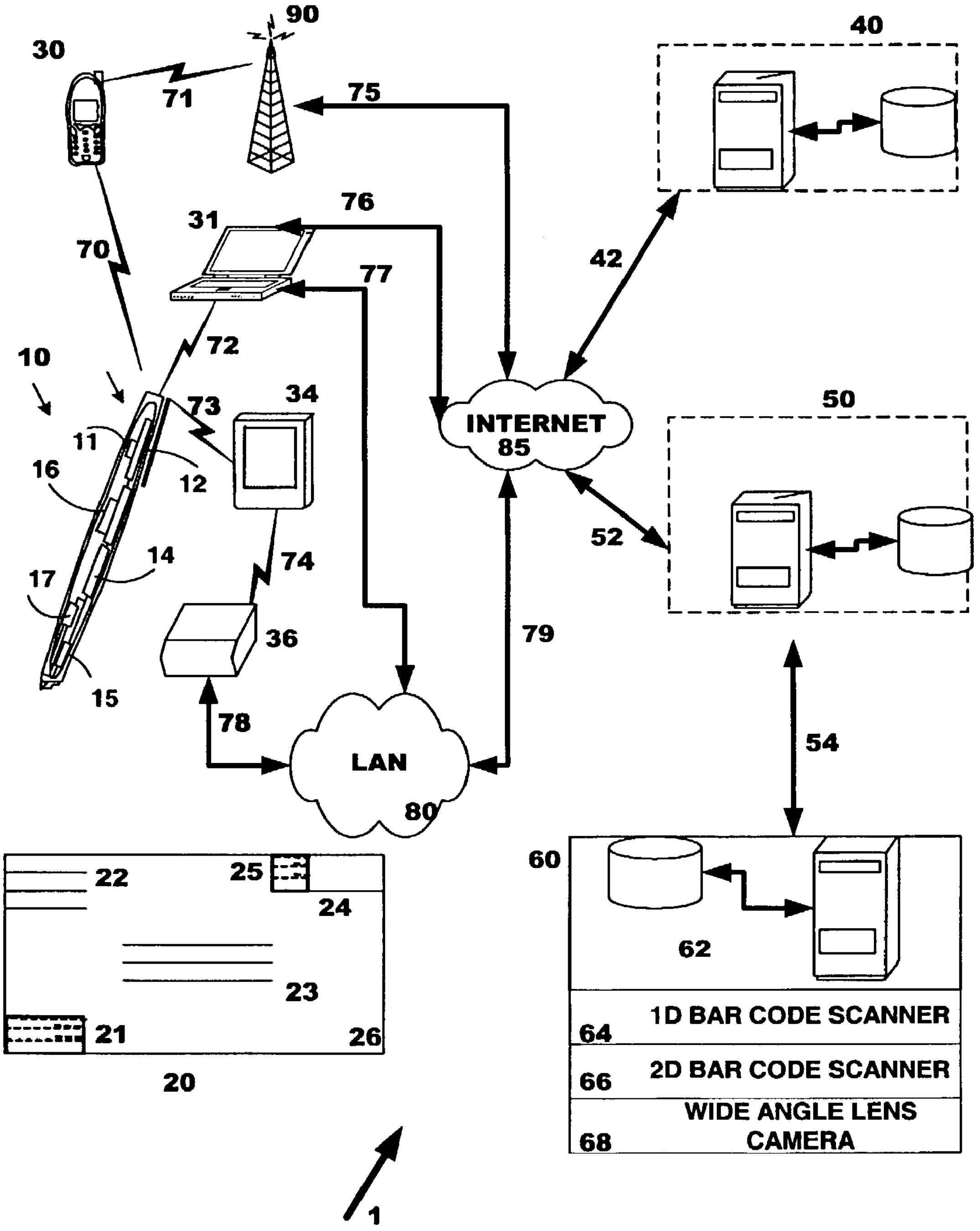
FIG. 1 is a schematic representation of a postal processing system according to an illustrative embodiment of the present application.

Postage meters may be characterized as operating in an open meter manner or a closed meter manner. A typical closed system postage meter includes a dedicated printer for printing evidence of postage used. A typical open system meter may utilize a general-purpose printer. Postal funds are often stored in a postal security device (PSD) that may employ a secure accounting vault. The typical postage meter user leases a postage meter and registers that postage meter with the United States Postal Service (USPS). The user fills the postage vault with funds and then dispenses the funds as postage by applying printed postage indicia to mail pieces that are then placed in the mail stream. The user may be identified by something that he has the postage meter with a unique serial number. Alternatively, the secure device or postage meter is used to secure payment when identification of the particular user is not required.

Funds transfer systems may require that a user be authenticated before a transaction is processed. Such systems seek to deter, prevent and detect fraud. A user may be authenticated using several techniques. For example, a system may authenticate a user by requesting information that the user knows such as a password or shared secret. Furthermore, a system may authenticate a user by asking the user to produce something that only the user has. Additionally, a system may authenticate a user by requesting evidence of something that the user is such as biometric data. Accordingly, a digital pen that is registered to a user and that is able to cryptographically authenticate the pen identity can be used as a token to authenticate the user because only the user should have access to the pen. In one configuration, the pen manufacturer ensures that each pen used in the system is uniquely identifiable. It is presumed that a lost token will be reported.

Certain mailing machines incorporate a funds-accounting device such as a vault or postal security device and an indicia-printing device into one mechanical enclosure having some security features to deter tampering.

Certain mailing machines provide an indicia having cryptographic signature and other information that may be used to verify that the indicia is valid and that the indicia was produced using an identifiable meter which guarantees by design that the funds are recorded and transferred to the carrier. The indicia may include both human and machine-readable information. For example, certain indicia information may be encoded as a 2D barcode that may be read by postal sorting equipment. The decoded information may be used for postage payment verification and fraud detection.

The USPS utilizes approximately 75,000 pieces of mail processing equipment. The mail processing equipment is designed to process information that has been encoded using certain standards such as a 2D barcode.

In an illustrative implementation, the system ensures that a particular pen is used and not spoofed by creating a Public Key Infrastructure (PKI) key set with associated certificates for the initial distribution of cryptographic keys.

A reference directed toward A Mail Processing System With Unique Mailpiece Authorization is described in U.S. Pat. No. 5,612,889, issued on Mar. 18, 1997 and incorporated herein by reference.

A reference directed toward using a digital pen for funds accounting devices and postage meters is described in commonly owned, co-pending U.S. patent application Ser. No. 10/065,336, filed on Oct. 4, 2002 and incorporated herein by reference.

A reference directed toward personal funds metering systems and method is described in commonly owned, co-pending U.S. patent application Ser. No. 10/248,249, filed on Dec. 30, 2002 and incorporated herein by reference.

In one postage payment system, the sender of a mail piece is given a unique identification number (UID) for each mail piece from a data processing center. In an alternative, the sender generates the UID. The data processing center authenticates the sender of the mail piece before providing the UID or before accepting a UID generated by the sender. The UID number is associated with customer information in the data processing center records and includes the payment method.

The customer associates the UID number with the mail piece by printing or writing that number on an envelope. The act of writing or printing the number that was provided to the authenticated user on a particular mail piece establishes that customer's intention to pay for the postal services related to handling the mail piece. Then, the customer places the mail piece into the mail stream. During processing, the USPS, reads the UID number on the mail piece and matches it against the corresponding record stored in the data processing center. The USPS thereby verifies that it can be paid for the services performed.

In such a system, the customer or sender is authenticated and then prints or writes the UID number on the envelope as an indication of the users intent to pay for postal services related to the specific mail piece. The system utilizes authentication of parties who participate in the transmission of the UID for security. The sender needs to print or handwrite the number on the envelope and USPS processing equipment needs to read it.

In an illustrative embodiment of the present application, the system does not require the cumbersome step requiring the sender to print or write the identifier on the envelope. Digital pen systems such as the Sony-Ericsson CHA-30 Chatpen utilize paper having an Anoto pattern available from Anoto AB of Sweden. In an illustrative embodiment, the user taps a digital pen over a printed "magic box" or pattern area of the envelope or label. When the user taps the box, the mail piece identifier is sent to a data center together with a pen identifier that is associated with the user and identifies the user. The message signifies that the registered user of the pen will pay for carrier services related to the mail piece or package identified by the mail piece identifier (such as a number), as described herein.

In an illustrative embodiment of the present application, the system utilizes at least two tagging methodologies such as using an identifier or identifiers with two encoding symbologies that can be associated. In the illustrative mail processing system described, the equipment includes the capability to detect and decode certain encoding symbologies. For example, the USPS has published the Domestic Mail Manual (DMM) and the Information Based Indicia Protocol documents (IBIP) that define certain symbologies and physical placement parameters for the allowable machine-readable symbols. In an illustrative carrier system such as the USPS, the described system of the illustrative embodiment eliminates the need to use new and expensive methods of reading new symbologies including patterns printed on paper for use with digital pens. When the carrier processes a mail piece or package, a second associative identifier using a traditional symbology such as the traditional barcodes, text OCR or RFID symbology will be used for processing and associated with the first identifier. The sender can pay for carrier's services and enjoy the convenience, flexibility and features of the digital pen or other new symbology. Accordingly, the system encodes the identity of a mail piece or package using two methods: one readable by a digital pen, the other using barcodes, OCR or RFID such as those normally used by the existing carrier processing systems. The two identifiers may be the same number encoded in different ways or can be associated by a formula or other method such as a look up database of the corresponding identifiers.

In an illustrative embodiment, a digital pen is used to authenticate a user who is authorizing payment for services related to mailing an envelope or package. The digital pen reads the mail piece identifier and sends it to a data center, thus indicating the user's authorization to charge the users account for the carrier's services related to the mail piece or package. The carrier's existing mail or package processing systems use optical scanning of barcodes, printed characters or RFID to read a second identifier that corresponds to the mail piece identifier. The system recognizes the mail piece identifier and matches it against a record in the data center that indicates which user must pay for the service of this mail piece as identified by the mail piece identifier. The system then optionally marks the record as being used to prevent subsequent use of the same identifier (fraud). Alternatively, other fraud detection methods are used. For example, the system may send a message for a non-round-trip update and later perform an off-line reconciliation. Additionally, the system may record information only during peak processing at speeds of up to 180 inches per second and then later process payment data and perform any desired verification.

Decoding Equipment.

The USPS utilizes thousands of pieces of sorting equipment that are each required to decode certain types of codes such as the 1D zip code bar codes, planet codes, postnet codes and 2D barcodes including the DataMatrix barcode and the PDF417 barcode. The Domestic Mail Manual and Information Based Indicia Program documents include specifications for the symbology and location required for encoded information. However, other codes may be available that cannot be decoded by the USPS equipment such as the Anoto pattern. Accordingly, the digital pen infrastructure is not yet sufficiently widespread and an association system is used to allow existing barcode decoding systems to be used in portions of the system infrastructure. The infrastructure for mail and package processing may not be compatible with the infrastructure for digital pens.

In an illustrative embodiment of the present application, a system for associating a first code with a second code is described. In the system, an envelope or label includes a first code such as an Anoto pattern. The envelope also includes a second code such as a Data Matrix 2D barcode. In one embodiment, the Anoto pattern and Data Matrix barcode encode the same identifier. In an alternative, a database is maintained that associates the first code with the second code. The postage payment system then uses the first code to indicate to the data center that an authenticated user is paying for services associated with this identifier. The postage processing equipment is only required to decode the second code that is also associated with the users account.

In an alternative, a camera such as a wide-angle camera lens camera is utilized. The system scans the entire envelope or package face in order to detect and decode various encoded information. Additionally, other detectors may be used to detect information including Optical Character Recognition (OCR), MICR and RFID.

Payment Systems.

Several types of value transfer systems are used in postage payment systems in general and by the USPS in particular. For example, stamps may be purchased and then utilized to pay for postage. A permit system may be used in which a mailer established an account with the USPS and then uses a manifest system to account for postage. Additionally, a value meter system such as a postage meter may be used. A postage meter is loaded with an amount of postage value that is then dispensed by printing postage indicia on mail pieces.

In another payment model, a broker may act on behalf of a customer to pay the postage due to the carrier such as the USPS as long as the USPS is convinced that the system is sufficiently secure. The broker is then responsible for paying the postage. In such a system, the user does not require a postage meter license. The broker obtains a postage meter license for the broker data center and obtains location information from the users. The broker then sends the location information such as the zip code to the USPS with the mail piece data. The broker is then responsible for identifying a particular package sender if required by the USPS.

In such a system, the user is authenticated and associated with a particular mail piece. The user provides an indication of willingness to pay for postage. The broker or carrier may first determine that suitable funds are available and then sends a notice back to the user that the authorization has been accepted. The mail piece is then rated when received and the appropriate funds are requested and transferred from the broker according to the mail piece identifier decoded from the mail piece by the carrier.

Account Initialization.

In the United States, a postage meter license is required to obtain a postage meter. Postage meters are leased to an entity for a particular location. The USPS tracks the location of meters according to the zip code in which the meter is used. An entity is required to obtain a postage meter license for each zip code in which the entity will operate a postage meter. The CMLS meter licensing system is used to obtain a license number for a user and provides the location of the meter. The license manufacturer may optionally obtain and maintain information about the user such as the location in which the meter will be used, the entity identifier such as a social security number for an individual or taxpayer ID for a company and the form of payment such as a credit card account or an account maintained with the postage meter manufacturer. Certain postage value dispensing devices are mobile. Accordingly, the USPS attempts to track the zip code from which a majority of mail will be franked and then relies on statistical distribution to presume that the same amount of mail will be brought into a post office from an out of zone mobile meter as is mailed from elsewhere using a local mobile meter.

In yet another postage payment model, a user provides identification to a broker in order to establish an account. The user provides a valid major credit card with other known identification techniques such that the broker is satisfied of the identity of the user. The user is then assigned a user number by the broker. In an illustrative embodiment, a Chatpen digital pen is utilized. The Chatpen has a unique identifier such as a serial number. The broker utilizes the Chatpen serial number or identifier as a customer identifier. Alternatively, the broker associates a user identifier such as a user number with the Chatpen identifier.

Digital Pen and User Authentication.

Digital pen systems such as the Sony-Ericsson CHA-30 Chatpen utilize Anoto paper available from Anoto AB of Sweden. The Anoto paper includes a grid for encoding information such as position information that is detected by the Chatpen. A specific location or one location in a certain 2D space can be used to identify a unique identifier or may provide data that is utilized as a unique identifier.

Here, the user authentication is based upon the association made between the pen's unique identifier and the information provided by the user for identification purposes that may include credit card information, a name, social security number, address or other information.

In an alternative, other scanners may be used to detect the pattern and decode the pattern to obtain an identifier. For example, a scanning device such as a scanning enabled PDA including those available from Symbol Technologies of New York may be used to authenticate a user and read an encoded identifier in order to associate a particular user with an encoded mail piece.

In a preferred embodiment, a user registers a Chatpen in a manner similar to the registration process of a traditional postage meter.

Unique Identifier.

In an illustrative embodiment of the present application, a unique mail piece identifier is utilized. A mail piece identifier may consist of an identifier that is not guaranteed to be unique, such as the Planet Code used by the USPS. However, there could be instances in which the mail piece is not uniquely identified. Preferably, a unique mail piece identifier is utilized. The unique mail piece identifier may be unique in a particular universe. For example, the unique mail piece identifier may be guaranteed unique for a period of time or over a subset of a system. Similarly, a customer identifier could be used and the unique identifier may be guaranteed unique for a particular user or company.

In an illustrative embodiment, the Anoto system provides a unique identifier based upon an x-y location in a two dimensional grid. The second identifier may be generated and then encoded in a 2D barcode as discussed herein. These two identifiers are then associated in a database located in the data center, before any customer uses the system.

In one embodiment, the mail piece identifier is designed to be unique over a two year time period. In another embodiment, the unique mail piece identifier space is dynamically allocated according to known algorithms.

In one embodiment, a globally unique identifier is created using a Guid utility that is available from Microsoft. A globally unique identifier created by a Guid utility typically includes information related to a time stamp and information from the data processor such as a unique network card MAC address, hard drive volume or other data. For example, a 32 byte globally unique identifier may be created. That identifier is then encoded into a 2D barcode printed on an envelope and associated with a unique Anoto pattern that is printed on the same envelope. The association is stored in a database at a data center.

In an illustrative embodiment, An Anoto pattern has a one-to-one correspondence with a mail piece identifier that is encoded in a 2D barcode on the envelope or label. The mail piece identifier is in a large enough domain that is sparsely populated such that randomly guessing a mail piece identifier will not be an effective fraud attack on the system. To successfully perpetrate a fraud on the system, one would have to guess a valid Guid and use it between the time that the pen's owner paid for the service and the time that the carrier processed the mail piece.

In an alternative, more than one Anoto pattern space is used on each envelope. Each pattern space is associated with a particular intention of the sender or other data. For example, one Anoto box may request first class service while another Anoto pattern may request priority mail service. In an alternative, Anoto patterns may be provided for First-Class Mail, Priority Mail, Priority Mail Flat Rate Envelope, Express Mail, Parcel Post, Bound Printed Matter, and Media Mail (Book Rate). In another alternative, special services may be indicated.

Accordingly, there will be a 2 or more to 1 correspondence between the unique Anoto patterns and the one unique mail piece identifier.

In alternative systems, 2 or more encoded mail piece identifier may be associated with one another such that a 1 to 2 or more correspondence may be provided between the Anoto pattern and the two or more mail piece identifiers that can each be encoded using a different encoding symbology or location that may be useful with the available scanning equipment. As another alternative, 2 or more unique Anoto patterns may be associated with 2 or more associated mail piece identifiers.

An Illustrative Value System.

Referring to FIG. 1, a first illustrative embodiment describing a postage payment evidencing system 1 is shown.

A Digital Pen 10 comprises a Chatpen and includes a processor 14, memory 12, ink 17, a camera or image sensor 15, a battery 16 and a Bluetooth™ transceiver 11. It also includes biometric sensors (not shown). The pen 10 is uniquely identified and utilizes known cryptographic techniques for authentication, non-repudiation and secure communications. The pen 10 provides haptic feedback for output. In an alternative, audible or visual signals may be used including a buzzer, voice output, a display or LED.

Handheld processor 34 comprises a PDA having Bluetooth and 802.11 wireless capabilities. In this illustrative example, wireless communications channels using Bluetooth are provided for communications links 70, 72 and 73. Wi-Fi is used for communications links 74 and 77. The cellular system is utilized for communications links 71 and 76. A landline is utilized for connection 75. A LAN connection is used for communications channel 78. Leased lines such as T1 or OC-3 lines are used for communications channels 42, 52 and 54.

Cellular telephone 30 is connected to cellular operator system 90. The cellular telephone could simply provide a data link such as a GSM link. In an alternative, the cellular telephone could include additional processing capacity and be used to capture and/or manipulate data and can operate as a collocated processor for executing an Anoto back end application.

Local Area Network 80 is connected to Laptop 31 utilizing a network such as a Wi-Fi connection 77 or an Ethernet network connection. PDA 34 can be connected to router 36 using a Wi-Fi connection and the router can provide connectivity to the LAN 80 that is then connected to the Internet 85. Known cryptography systems may be utilized including public key cryptography, certificate based systems, session key systems such as SSL, digital signature authentication and the Kerberos system. Alternatively, other known communication systems may be utilized.

An Anoto TM pattern look-up server (PLS) 40 is used by the system to provide the pattern identifier and data associated with the pattern such as the URL of the associated application. Alternatively, a Universal Resource Identifier (URI) may be used. The PLS may also be used to authenticate the pen using known cryptographic techniques.

A broker data center 50 is connected to the Internet 85 and is identified as the associated application by the URL provided by the PLS 40. The system may utilize the pen processor and/or one or more collocated external processors to process information described. For example, the pen may provide only pen stroke and pattern information to the collocated processor or the pen may alternatively process the information algorithm including communications with the PLS 40 and broker data center 50 using the collocated processor to pass messages through. The communications channels may utilize protocols such as TCP/IP and may also use protocols including HTTPS to encrypt communications to provide for secure communications. A collocated processor includes a processor in proximity to the first processor in communication with the first processor such as over a wireless link. The wireless link may include a short range link such as a Bluetooth Personal Area Network and the collocated device may be in such proximity to be useful as the user interface for the user of the first processor.

The Postal Processing Facility (PF) 60 includes a connection to the Internet and a connection to the broker data center 54. The Processing Facility 60 includes a postal system data center 62 and includes decoding systems such as the 1D barcode scanner 64, the 2D barcode scanner 66 and optionally the camera system 68 such as the wide-angle lens camera. Alternatively, the connections to the Postal Authority 60 could be over private lines or may be a Virtual Private Network. It is contemplated that all of the connections utilize appropriate security measures.

Here, the Postal Processing Facility (PF) belongs to the USPS.

Alternatively, another carrier or processing outsourcing service may operate the PF. Either the Postal Authority or a third party may operate the Broker Data Center 50. The servers are in a production environment dedicated to servicing brokered postage processing and payment transactions.

Laptop 31 utilizes a mobile Pentium 4 processor and Windows XP Professional such as a laptop available from Dell with an operating system available from Microsoft. The server processors are geographically and load balanced application servers using systems available from Sun Microsystems and the storage servers use multiple location redundant backup systems. Additionally, other appropriate wireless and wired networks and connections may be utilized. It is contemplated that other communications channels such as OC-3 lines or wireless connections could be used in place of the T1 lines. Similarly, the other communications channels could be replaced with alternatives. As can be appreciated, various communication flows may be utilized, some of which will be chattier than others. Laptop 31 could provide gateway access to the TCP/IP Internet network.

Additional systems compliant with hardware layer protocols such as the versions of the IEEE 802.11 are available as well as systems such as Wi-Fi compliant systems. Typical wired network interface cards (NIC) utilize the Ethernet protocol in which each individual Ethernet card produced is assigned a unique address. An address issuing authority ensures that the addresses assigned to the various manufacturers are unique. Bluetooth™ systems do not generally require user intervention to connect to the Personal Area Network access point. In this embodiment, appropriate security at several protocol layers is utilized including the application layer.

The envelope or label 20 includes a substrate 26 having a space for a return address 22 and a destination address 23. There is space 24 for a stamp or meter indicia. An Anoto pattern 21 including a magic box is included on the envelope and an associated 2D barcode 25 is printed on the envelope. The envelopes or labels may be preprinted or printed by a user program. The encoded identifiers 21 and 25 are associated with each other and have a one to one correspondence. Alternatively, the relationship may be a many-to-one relationship if the system uses multiple magic boxes from Anoto. The placement of encoded identifier 25 may vary to suit the needs of existing processing facilities.

Figure 2:
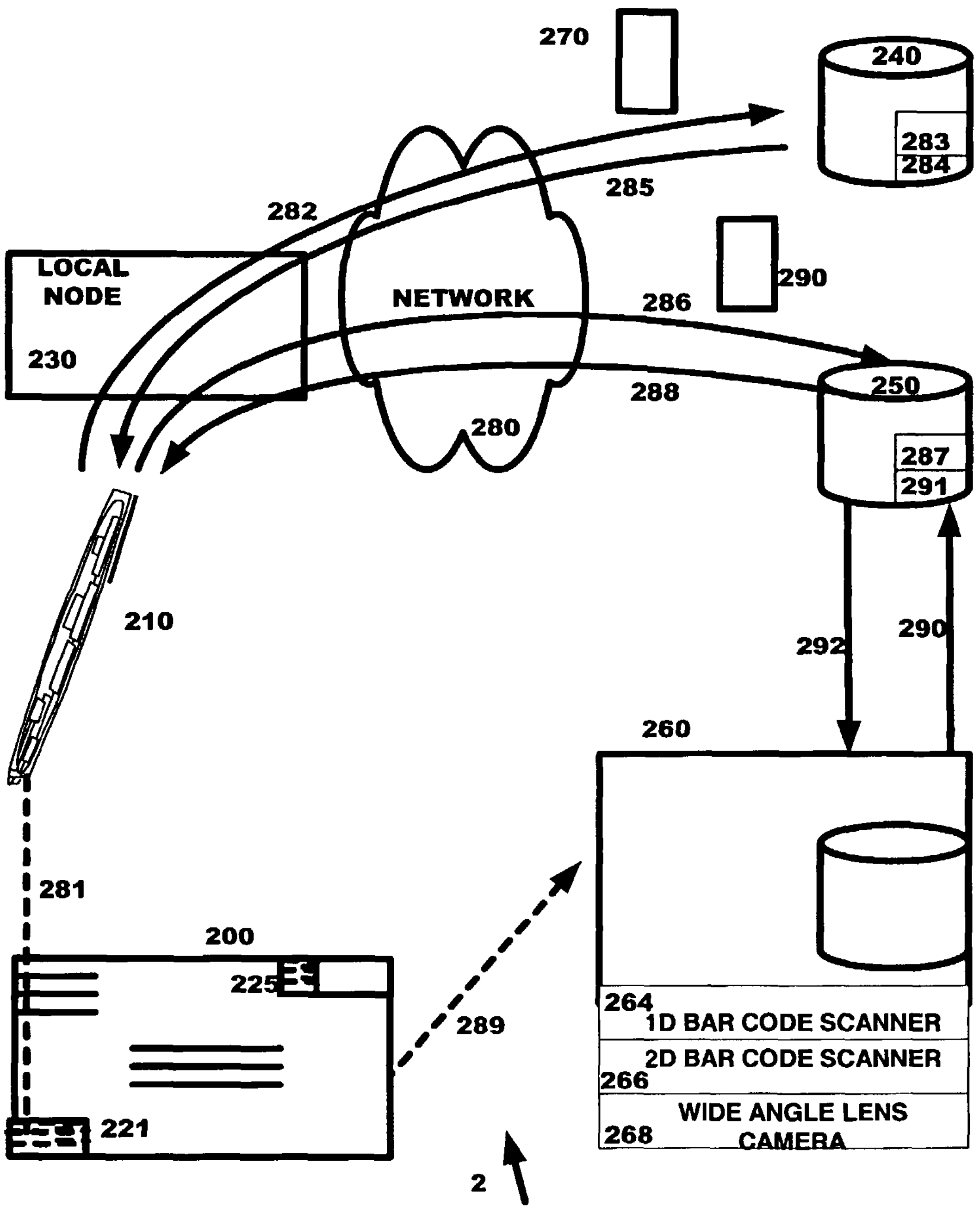
FIG. 2 is a schematic representation of the data flow in a postal processing system according to an illustrative embodiment of the present application.

Referring to FIG. 2, a schematic representation showing the data flow in a postal processing system 2 according to an illustrative embodiment of the present application is shown.

In this embodiment, an envelope 200 includes an Anoto pattern 221 and an associated 2D barcode 225. Alternatively, the barcode 225 and pattern 221 are later associated.

The pen 210 is registered to a user that has an account with the broker. The pen 210 includes a key that is used to digitally sign messages sent from the pen in order to provide authentication of the message. The pen 210 has a unique identifier such as a serial number that is linked to the users broker account. The broker maintains an account for payment of postage that may contain a balance or a credit line or other known financial instrument.

The mail piece 200 has at least one unique ID printed using a barcode 225 with encoding supported by the carrier. In an illustrative embodiment, the identifier is guaranteed to be unique over a time of two years. Alternatively, the identifier is guaranteed to be unique in a particular postal system for a specified period of time. In another embodiment for SOHO or personal users having low volume transactions, a customer number and sequence are used to ensure a unique identifier. The broker data center 250 has prior knowledge of the association between the unique ID represented by the barcode 225 and the ID of the Anoto pattern magic box 221 located on the mail piece 200. The barcode comprises a 2D barcode such as the PDF417 barcode or the DataMatrix barcode. Alternatively a 1D barcode is used. The barcode is only one example of the more generic class of methods used by carriers to identify mail pieces or parcels and other tagging methods including RFID tags may be used.

The manufacturer of the envelope or label 200 communicates the identifier association to the broker data center 250. Alternatively, the broker data center 250 retrieves this information when necessary. The pen 210 communicates with the PLS 240 through one or more devices like the local node 230. In an illustrative embodiment, the local node 230 does not affect the content of the messages and merely operates to encapsulate and provide for secure communication such as by providing TCP/IP and HTTPS capability for privacy of messages and authentication of the Pattern Lookup Service System.

The user of a pen 210 ticks the magic box 221 on the mail piece 200 to indicate his intention to pay the carrier for the service. As a result, the pen 210 reads the ID of the magic box 210 using the optical sensor and path 281. The pen 210 initiates a session with the Pattern Lookup Service (PLS) 240 and sends an encrypted message using the local node 230 and network 280 along path 282 containing the ID of the pen 210 and the ID information regarding the unique Anoto pattern 221.

The PLS 240 then uses process 283 to decrypt the message and retrieve from its database the URI of the service associated with the Anoto pattern 221. The service associated with this particular application is a URI or other association with the broker data center 250.

The PLS 240 generates a ticket 270 using process 284 that comprises the pen ID, transaction ID, and timestamp. The ticket 270 is digitally signed by the PLS system 240 in order to authenticate the ticket. Known processes including Application Session Handoff (ASH) and ticket handoff of processes that include authentication of a user are utilized.

The PLS 240 sends to the pen 210 an encrypted response containing the ticket 270 and the URL of the service supporting the application along path 285. Here, the URL points to the broker data center 250.

The pen 210 then utilizes the local node 230 and network 280 to send a signed and encrypted message to the Data Center 250 that contains the ticket 270 and the ID of the Anoto pattern 221 along path 286.

The broker Data Center 250 validates the authenticity and the integrity of the message and extracts the ID of the pen 210 and the ID of the Anoto pattern 221 in process 287. The process 287 is used to authenticate the pen 210 and the ticket 270. The Data Center 250 creates a record that indicates that the owner of the pen 210 agreed to pay for the services related to the processing of the mail piece 200 identified by the ID of the magic box 221 and its associated ID in the barcode 225. The record contains the ID of the customer and the ticket 270.

If the previous step is successful, then the Data Center 250 sends a positive acknowledgement to the pen 210 along path 288. For example, the pen provides haptic feedback as a vibration that the transaction was successful. Otherwise, the pen 210 receives an error message. The turn around time until notification is on the order of a few seconds.

The mail piece 200 is then physically inserted into the mail stream on path 289 to be processed by the carrier. It eventually is processed by a mail-processing center 260. The mail-processing center includes processing and sorting equipment that includes 1D barcode scanners 264, 2D barcode scanners 266 and optionally wide-angle lens cameras 268.

The mail piece 200 is processed and it arrives at the Mail Processing Facility 260. The scanning equipment of MPF 260 is used to read the secondary identifier barcode 225. The MPF 260 sends a message to the Data Center 250 along path 290 requesting validation of the mail piece identified by the barcode 225. In an illustrative embodiment, the system weighs or dimensionally weighs a mail piece to rate the mail piece. Alternatively, other rating systems are used to calculate the fee charges for selected services.

The Data Center 250 then searches its database using process 291 and retrieves the record that associates the barcode 225 with the ID of the magic box 221. Then it searches its database to find any record that indicates that an owner of a pen agreed to pay for the services related to the processing of the mail piece 200. In an illustrative embodiment, the broker data center pays the postal service for the postage. In an alternative, a batch of mail piece postage values are aggregated and paid together.

If the previous step succeeds, then the Data Center 250 sends a message along path 292 to the MPF 260 indicating that the processing of the mail piece can continue normally.

Otherwise, the Data Center 250 sends a message to the MPF 260 indicating that the mail piece 200 should be processed as an exception.

In an alternative, the Anoto pattern is preprinted on an envelope or label, but the user prints the second identifier. The broker data center assigns the second identifier and associates it with the preprinted Anoto pattern. In yet another alternative, the Anoto pattern and second identifier are printed by the user and assigned by the data center.

In an alternative, the second identifier is printed in the same area as the Anoto pattern.

In an alternative and as more thoroughly discussed in the incorporated applications, the Anoto pattern may be used to capture return address and destination address information as well as biometrically authenticating the user.

The Return Address box allows a user to provide identification information and also provide the function of a return address in letting the postal authority know where to return undeliverable mail. The return address could be utilized with the biometric data. For example, a company may have an account linked to a return address that may be accessed by two or more users having a digital pen 10. Each user would have identifying biometric information on file. Accordingly, the Return address could be used for account selection and the biometric data used for sub-account selection and authorization.

In yet another alternative, a traceable mail piece identifier box 220 allows a user to provide a handwritten mail piece identification code. In yet another alternative, the broker data center may provide a unique mail piece ID to the user through a cellular telephone display or other display such as a display on the digital pen. The cellular telephone can be used to enhance security by having the user input a PIN before the ID is sent.

In an illustrative embodiment, the user selects a class of service and thereby authorizes the postal authority 260 to receive payment from a postage broker account such as an account with the trusted third party at the data center 250. The postal authority determines the correct postage based upon criteria such as weight, dimensions and/or class of service. The postal authority then debits the funds from the user before processing the mailpiece and appropriate messages are transferred between the postal authority 260 and the data center 250.

Figure 3:
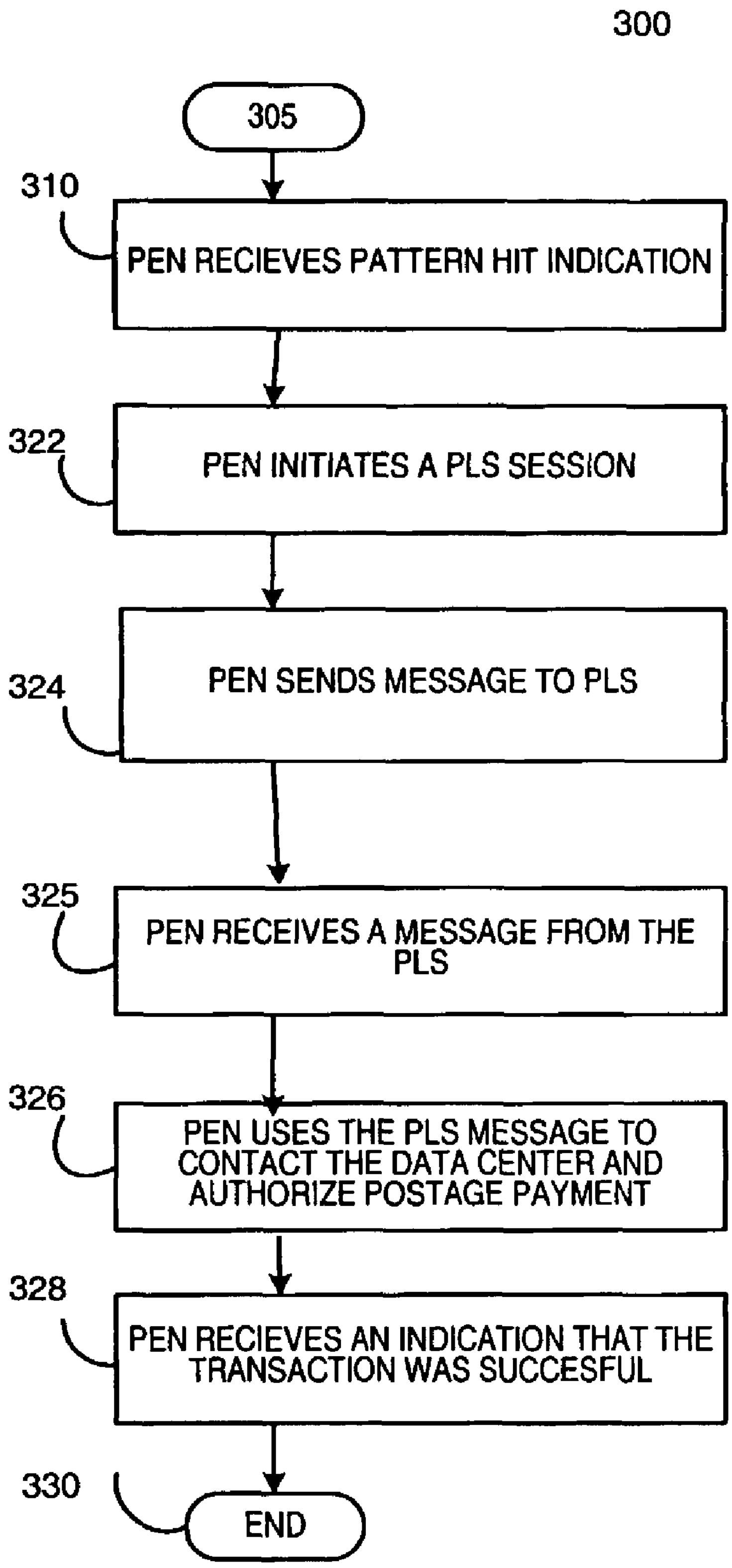
FIG. 3 is a flow chart showing a process for receiving a mailing indication from a user according to an illustrative embodiment of the present application.

Referring to FIG. 3, a method for authorizing payment of postage according to an illustrative embodiment of the present application is shown. The process 300 starts in step 305. In step 310, the pen receives an indication that it has been placed on or ticked an Anoto pattern. In step 322, the pen initiates a PLS session in order to look up the pattern and be provided with information regarding that particular pattern. In step 324, the pen sends a message to the PLS. In step 325, the pen receives a message from the PLS that includes data regarding the pattern, a timestamp, the pen ID and contact information for the associated application such as a URL.

In step 326, the pen uses the PLS message to contact the data center and to authorize postage payment. In step 328, assuming that the transaction successfully completed, the pen receives an indication that the transaction was successful. The process sends in step 330.

Figure 4:
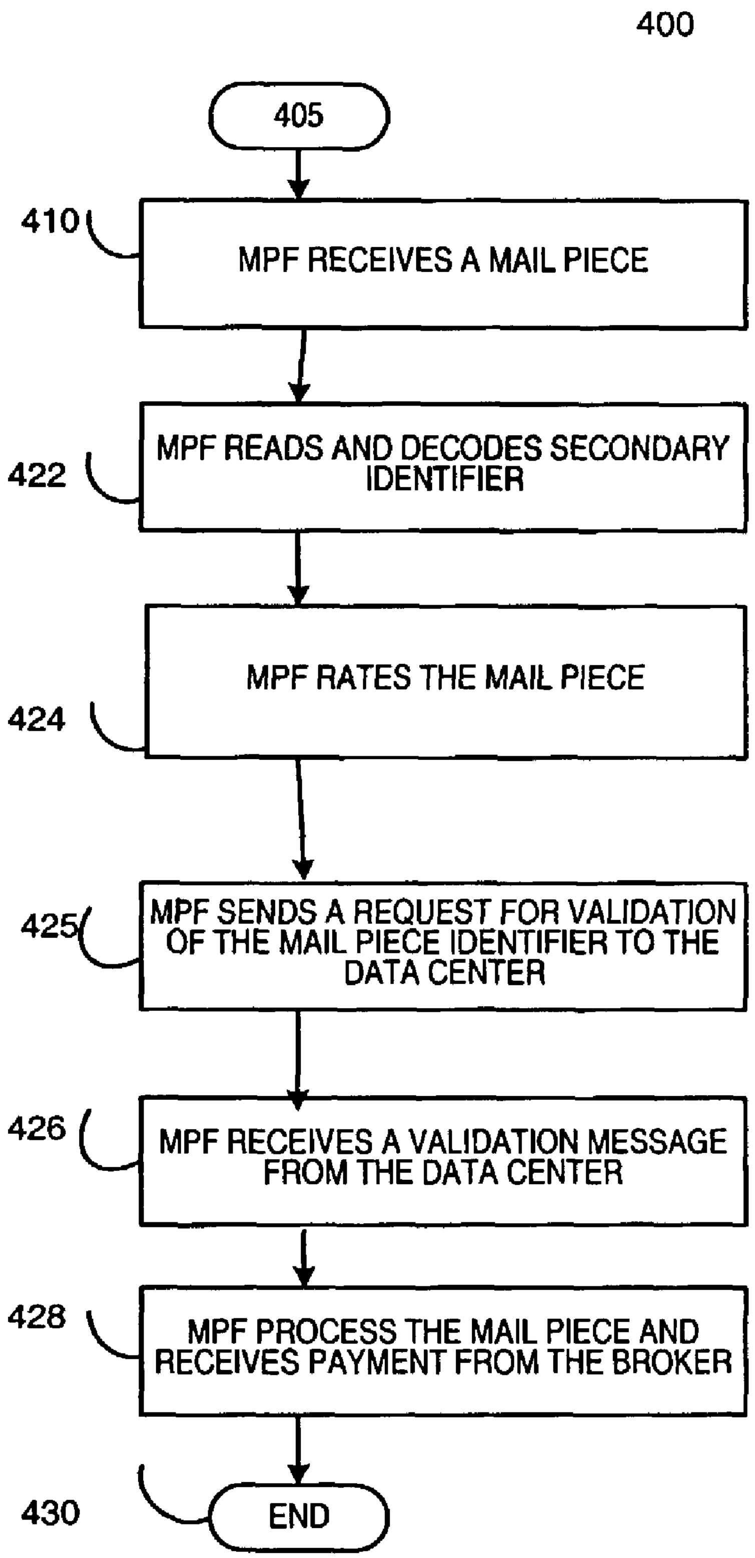
FIG. 4 is a flow chart showing a process for verifying mail piece data according to an illustrative embodiment of the present application.

Referring to FIG. 4, method for verifying authority for payment of postage according to an illustrative embodiment of the present application is shown. The process 400 starts in step 405. In step 410, the mail Processing Facility MPF receives a mail piece including the mail piece identifier and Anoto pattern. In step 422, the MPF reads and decodes the secondary mail piece identifier using the barcode scanner. In step 424, the MPF optionally weighs and rates the mail piece. Alternatively, dimensional weighing or other rating methods are utilized. In step 425, the MPF sends a request for validation of the mail piece identifier to the data center.

In step 426, the MPF receives a validation message from the data center assuming that the mail piece is valid. In step 428, the MPF processes the mail piece and then receives payment from the broker.

Figure 5:
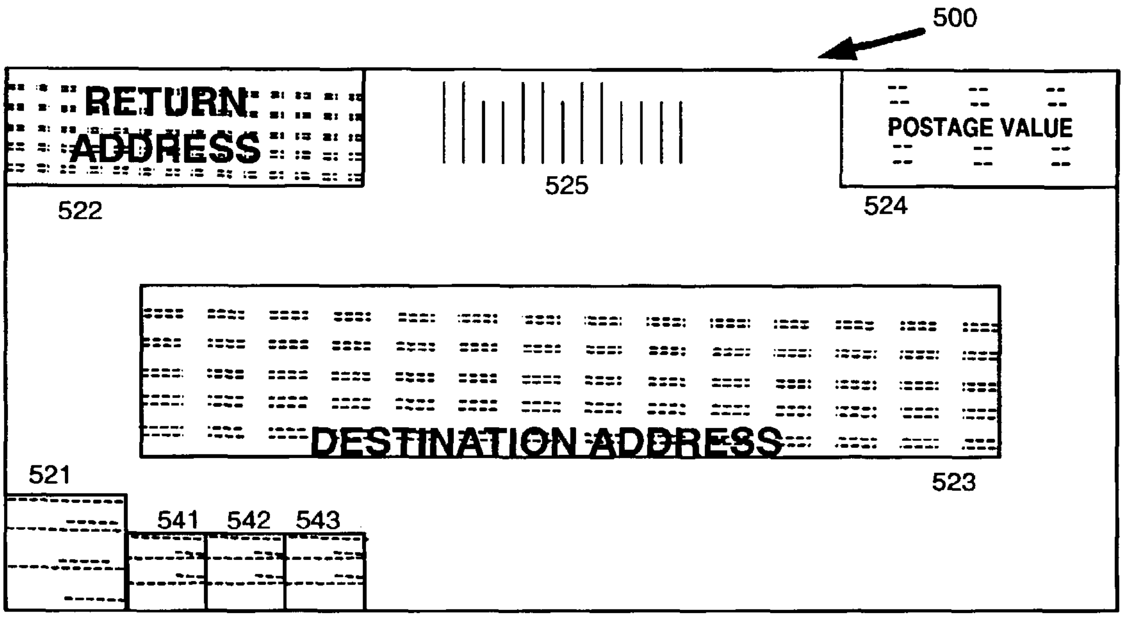
FIG. 5 is a schematic representation of an envelope according to an illustrative embodiment of the present application.

Referring to FIG. 5, an envelope according to an illustrative embodiment of the present application is shown. The envelope 500 includes a return address section 522, a postage value section 524, and a destination address section 523. A 1D barcode 525 includes the mail piece identifier and is placed in a location that can be scanned by traditional mail processing equipment. An Anoto pattern 521 indicates authorization of payment for first class postage when selected using a registered Anoto pen. Similarly, Anoto patterns 541, 542 and 543 indicate authorization for alternative classes of service. The return address 522 and destination address 523 sections may be printed with an Anoto pattern so that the written addresses are captured. The written addresses are optionally recognized using OCR algorithms.

Figure 6:
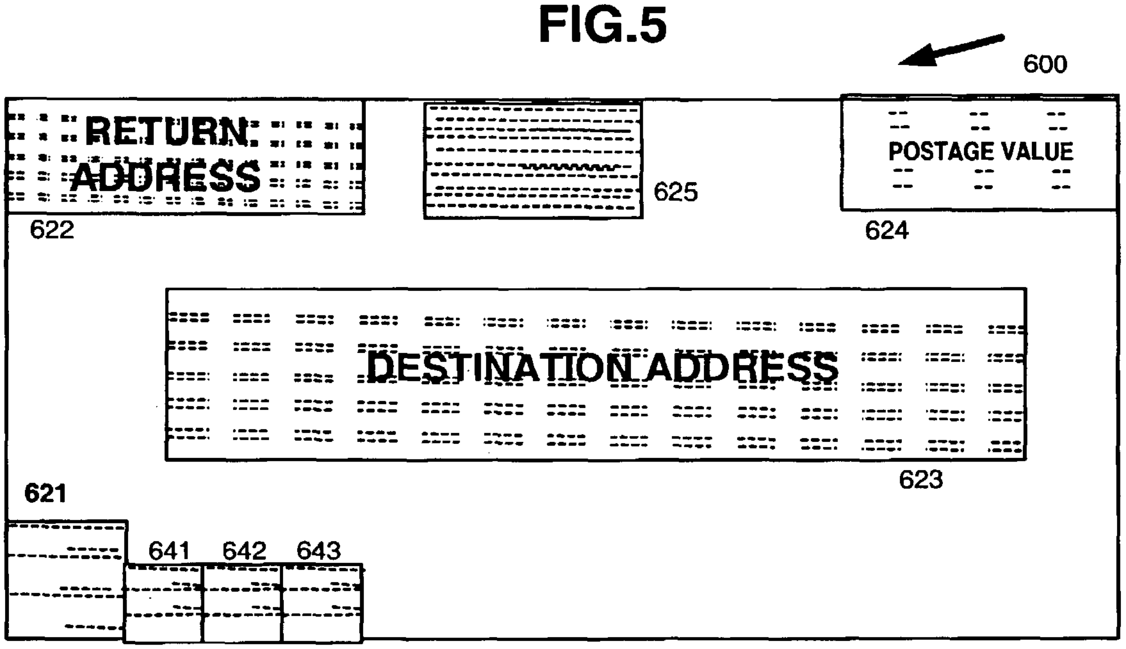
FIG. 6 is a schematic representation of an envelope according to another illustrative embodiment of the present application.

Referring to FIG. 6, an envelope according to an illustrative embodiment of the present application is shown. The envelope 600 includes a return address section 622, a postage value section 624, and a destination address section 623. A 2D barcode 625 includes the mail piece identifier and is placed in an acceptable location that can be scanned by traditional mail processing equipment. An Anoto pattern 621 indicates authorization of payment for first class postage when selected using a registered Anoto pen. Similarly, Anoto patterns 641, 642 and 643 indicate authorization for special services such as delivery receipt. Here, the return address 622 and destination address 623 sections may be printed with an Anoto pattern so that the written addresses are captured. The written addresses are optionally recognized using OCR algorithms and may be used in preparing the delivery receipt.

In an alternative embodiment, the multiple magic boxes 641, 642 and 643 may represent processing for different weights of a letter.

In an alternative embodiment, a postal value field box 524 is provided that also utilizes the Anoto pattern. A user will handwrite a postal value using the digital pen of system 1. The system may then automatically debit the postal value written with the pen from the user postal value vault because the pen can recognize that the user is writing in the postal value box 524. In another alternative, the postal value is only debited from the user account after the postal authority receives the mail piece.

In another embodiment, the pattern is used to define an envelope having a set of dimensions and a maximum weight. Accordingly, when the user fills in the envelope, the mail piece is pre-rated and the postage deducted from the user postage account before being deposited with the postal service.

In an alternative, a user may select the special service or return receipt requested. The system uses the captured destination data and sender data to create and fill in a return receipt postcard for the user.

As can be appreciated, many alternative embodiments are possible. Many users can use the system. Additionally, multiple types of digital pens may be used and may be able to provide different biometric data. A single pen may be registered to a group of users and a single user may be cross-registered to use more than one pen. In another alternative, the system includes more than one Meter Data Center and/or postal authorities. In another alternative, the postal authority issues a mail piece identifier.

The present application describes illustrative embodiments of a system and method for providing funds accounting including postage payment and verification. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A system for processing an article to process payment for delivery of the article comprising:

a first subsystem including a first processor for receiving data related to a first encoded identifier detected on the article and for associating the received data with a user and an indication of intent to pay for delivery of the article;

a second subsystem including a second processor for decoding a second encoded identifier detected on the article, wherein the second encoded identifier utilizes a traditional delivery system symbology; and a third subsystem including a third processor for associating the decoded second identifier with the user and the indication of intent to pay for delivery of the article, wherein, the first encoded identifier is encoded using digital pen pattern.

2. The system of claim 1 wherein:

the second encoded identifier is encoded using a 2D barcode.

3. The system of claim 1 wherein:

the first identifier and second identifier are identical positive integers.

4. The system of claim 2 wherein:

the article is a mail piece.

5. The system of claim 4 wherein:

the first subsystem includes a digital pen configured to read the digital pen pattern.

6. The system of claim 5 wherein:

the second subsystem includes a mail piece sorter including a 2D barcode decoder.

7. The system of claim 1, further comprising:

a fourth subsystem configured to record the second decoded identifier as used after it is processed by the second subsystem.

8. The system of claim 1, wherein:

the third subsystem comprises a lookup database.

9. The system of claim 1, wherein:

the first identifier and the second identifier are associated using a formula.

10. A system for processing an article to process payment for delivery of the article comprising:

a first subsystem including a first processor for receiving data related to a first encoded identifier detected on the article and for associating the received data with a user and an indication of intent to pay for delivery of the article;

a second subsystem including a second processor for decoding a second encoded identifier detected on the article, wherein the second encoded identifier utilizes a traditional delivery system symbology; and a third subsystem including a third processor for associating the decoded second identifier with the user and the indication of intent to pay for delivery of the article, wherein, The system of claim 1, wherein:

the first encoded identifier comprises handwritten digital pen strokes.

11. The system of claim 1, further comprising:

a subsystem configured to process payment data related to the delivery after the second identifier is decoded.

12. The system of claim 1, further comprising:

means for authenticating the user with the digital pen input.

13. The system of claim 1, further comprising:

means for providing an indication of acceptance to the user acknowledging the indication of intent to pay for delivery.

* * * * *